United States Patent
Ampleman et al.

(10) Patent No.: US 6,479,614 B1
(45) Date of Patent: Nov. 12, 2002

(54) ENERGETIC COPOLYURETHANE THERMOPLASTIC ELASTOMERS

(75) Inventors: Guy Ampleman, St. Augustin de Desmaures (CA); Andre Marois, Val-Belair (CA); Sylvain Desilets, Ste-Foy (CA)

(73) Assignee: Her Majesty the Queen as represented by the Minister of Defence of Her Majesty's Canadian Government, Ottawa (CA)

( * ) Notice: Subject to any disclaimer, the term of this patent is extended or adjusted under 35 U.S.C. 154(b) by 0 days.

(21) Appl. No.: 09/517,458

(22) Filed: Mar. 2, 2000

Related U.S. Application Data

(63) Continuation-in-part of application No. 09/058,865, filed on Apr. 13, 1998, now abandoned.
(60) Provisional application No. 60/053,068, filed on Jul. 18, 1997.

(30) Foreign Application Priority Data

Sep. 8, 1997 (CA) .............................. 2214729

(51) Int. Cl.⁷ .............................................. C08G 18/50
(52) U.S. Cl. ...................... 528/78; 149/19.4; 149/19.6; 149/122
(58) Field of Search ............................ 528/78; 149/122, 149/19.4, 19.6

(56) References Cited

U.S. PATENT DOCUMENTS

| | | |
|---|---|---|
| 2,871,218 A | 1/1959 | Schollenberger |
| 3,214,411 A | 10/1965 | Saunders et al. |
| 4,288,262 A | 9/1981 | Flanagan et al. |
| 4,707,540 A | 11/1987 | Manser et al. |
| 4,806,613 A | 2/1989 | Wardle |
| 4,925,503 A | 5/1990 | Canterberry et al. |
| 4,952,644 A | 8/1990 | Wardle et al. |
| 5,009,728 A | 4/1991 | Chan et al. |
| 5,223,056 A | 6/1993 | Ahad |
| 5,507,891 A | 4/1996 | Zeigler |
| 5,540,794 A | 7/1996 | Willer et al. |
| 5,556,935 A | 9/1996 | Träubel et al. |
| 5,587,553 A | 12/1996 | Braithwaite et al. |
| 6,051,087 A | * 4/2000 | Hutchens et al. |

FOREIGN PATENT DOCUMENTS

| | | |
|---|---|---|
| CA | 1 160 455 | 1/1984 |
| GB | 1087743 | 6/1965 |

OTHER PUBLICATIONS

Desiletas et al.; Structural Characterization of Glycidyl Azide Polymer Binders; 25th International Conference of ICT; 1994; pp. 96 (1–14).*

* cited by examiner

Primary Examiner—Rachel Gorr
(74) Attorney, Agent, or Firm—Nixon & Vanderhye P.C.

(57) ABSTRACT

An energetic copolyurethane thermoplastic elastomer (ETPE) is prepared by polymerizing a dihydroxyl terminated telechelic energetic polymer having a functionality of two or less with a diisocyanate at a NCO/OH ratio of about 0.7 to 1.2. The resulting copolymer is easy to incorporate in gun propellant or explosive formulations and is recyclable. These energetic copolyurethane thermoplastic elastomers were obtained mainly by macropolymerization of GAP prepolymers with 4,4'-methylenebis-phenyl isocyanate (MDI). In these syntheses, GAPs having molecular weights of 500, 1000 and 2000 were used as macromonomers and polymerized with MDI to yield three different copolyurethane thermoplastic elastomers. This process may be applied to any dihydroxyl terminated energetic prepolymers. The hard segments of the ETPE are obtained by the formation of hydrogen bonds between the urethane groups.

38 Claims, No Drawings

ENERGETIC COPOLYURETHANE THERMOPLASTIC ELASTOMERS

This is a continuation-in-part of U.S. application Ser. No. 09/058,865, filed Apr. 13, 1998, now abandoned and claims priority from provisional application No. 60/053,068, filed Jul. 18, 1997.

FIELD OF THE INVENTION

The present invention relates to a thermoplastic elastomer, and is particularly concerned with an energetic thermoplastic elastomer having urethane moieties as its thermoplastic A segments.

BACKGROUND OF THE INVENTION

Thermoplastic elastomers typically consist of copolymer chains having monomers A and B distributed throughout the chains as ABA or AB, where the A is the hard segment providing the thermoplastic characteristic and B is the soft segment providing the elastomeric behavior to the polymer. Conventionally, the A segment is formed by a crystalline homopolymer and the soft segment is formed by an amorphous homopolymer.

Thermoplastic elastomers of the type ABA are usually obtained by polymerization the soft B segment followed by the addition of the hard A segment, which is crystallisable. To achieve this type of copolymerization, monomers of both types should have similar reactivity to provide a copolymer of controlled structure with suitable adjustable mechanical properties. A good example of this type of technology is the preparation of 3-azidomethyl-3-methyloxetane and 3.3-bis(azidomethyl)oxetane (AMMO/BAMO) energetic thermoplastic elastomer described in U.S. Pat. No. 4,707,540 to Manser et al. and U.S. Pat. No. 4,952,644 to Wardle et al. In this energetic thermoplastic elastomer (ETPE), the thermoplastic part is obtained by the crystallization of the BAMO polymer. Manser et al. also described the use of these AMMO/BAMO energetic homopolymers as prepolymers in making thermoset binders for use in propellants. To obtain the thermoset binders, Manser et al. would typically cure the AMMO/BAMO prepolymers with a triol and diisocyanate to form a chemically cross-linked matrix to obtain the desired binder.

In the case of copolymers of the type AB, the thermoplastic elastomers are usually obtained by mixing monomers that have compatible reactive ending groups. U.S. Pat. No. 4,806,613 to Wardle describes such a method of synthesis. Similarly to Manser et al., Wardle also uses BAMO as the crystalline hard segment. For this, he end capped both the A and B homopolymers with toluene diisocyanate (TDI) leaving at each end an unreacted isocyanate, mixing both homopolymers and joined them by using a small chain extender. Alternatively, Wardle used a block linking technique consisting of reacting the B block with phosgene or a diisocyanate followed by the addition of the A block to form the thermoplastic elastomer. Once again, the crystalline homopolymer BAMO which is an expensive starting material is required to form the hard segment of the thermoplastic elastomer.

SUMMARY OF THE INVENTION

It is an object of the present invention to provide an energetic thermoplastic elastomer that is inexpensive to produce by avoiding the use a crystalline homopolymer to form the A segment.

In accordance with one aspect of the present invention, there is provided a thermoplastic elastomer comprising copolymer chains having urethane moieties physically bonded to one another by hydrogen bonds to yield the hard segment of the thermoplastic elastomer.

More specifically, the thermoplastic elastomer of the present invention have copolymer chains, which may be represented by the formulae:

$$HO-P-(U-P)_n-OH \qquad (I)$$

wherein P is selected from the group consisting of

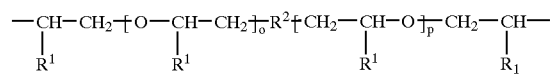

where the $R^1$ groups are the same and selected from the group consisting of $-CH_2N_3$ and $-CH_2ONO_2$;

$R^2$ is selected from the group consisting of $-OCH_2CH_2O-$, $-OCH_2CH_2CH_2O-$ and $-OCH_2CH_2CH_2CH_2O-$; and o and p are each $\geq 1$; and

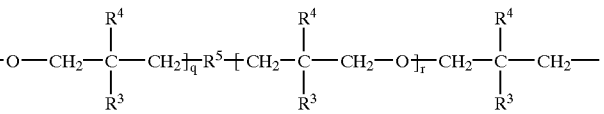

where the $R^3$ groups are the same and selected from the group consisting of $-CH_2N_3$ or $-CH_2ONO_2$ when $R^4$ are $-CH_3$; or $R^3$ and $R^4$ are both $-CH_2N_3$ $R^5$ is selected from the group consisting of $-OCH_2CH_2O-$, $-OCH_2CH_2CH_2O-$ and $-OCH_2CH_2CH_2CH_2O-$; and q and r are both $\geq 1$ U is selected from the group consisting of

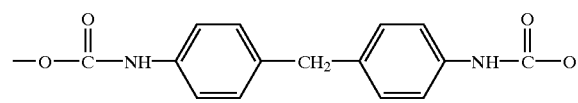

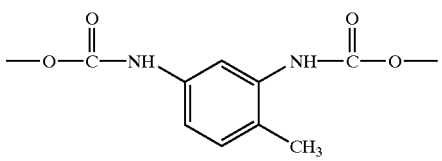

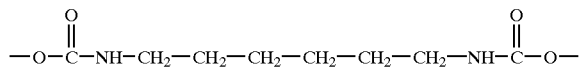

and

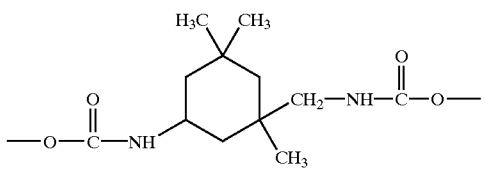

and n is 1 to 100;

wherein the A block is provided by said U moieties and the B block is provided by the P moieties.

Preferably, P has a molecular weight ranging from about 500 to about 10,000.

In accordance with another aspect of the present invention, the thermoplastic elastomer further comprises a chain extender such as

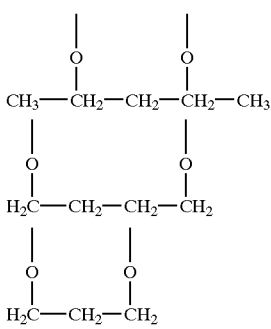

or —OCH$_2$—(CH$_2$)n—CH$_2$O— where n is 0 to 8.

In the presence of a chain extender, the copolymer chains of the thermoplastic elastomer of the present invention may further be described with the following structure:

$$HO—P—(U—(C—U)_a—P)_b—U—P—OH \quad (II)$$

wherein P, U and C, which is the chain extender, are defined above; a is 1 to 100 and b is 1 to 100.

Alternatively, the copolymer chains may have the following structure:

$$HO—P—U—(C—U)x—(P—U)y—(C—U)z—P—OH \quad (III)$$

wherein P, U and C are defined as above; and x, y and z are each 1 to 100.

The thermoplastic elastomer of the present invention is produced by drying a dihydroxyl terminated telechelic energetic prepopolymer having a functionality of two or less, and polymerizing the dried energetic prepolymer with a diisocyanate at a NCO/OH ratio ranging from about 0.7 to about 1.2, and preferably about one, under dried conditions. The use of dried reactants couple with providing a dried environment, i.e. avoiding the presence of water, during the polymerization step prevent the formation of undesired covalent bonds between the growing chains (chemical crosslinkings). This may be further prevented by purifying the diisocyanate prior to its use.

Preferably, the reaction is performed in the presence of a suitable catalyst such as dibutyltin dilaurate, which is added to the prepolymer prior to drying the latter to ensure its perfect dispersion in the prepolymer.

Suitable prepolymers are glycidyl azide polymer, 3-azidomethyl-3-methyloxethane, 3-nitratomethyl-3-methyloxetane, 3,3-bis(azidomethyl)oxetane and glycidyl nitrate that have molecular weights ranging from about 500 to about 10,000.

Suitable diisocyanates are 4,4' methylenebis-phenyl isocyanate, toluene diisocyanate, hexamethylene diisocyanate and isophorone diisocyanate.

Chain extenders such as 2,4-pentanediol, 1,3-propanediol, 1,4-butanediol or a diol having the formula: HO—CH$_2$—(CH)n—CH$_2$—OH where n is 0 to 8 may be added to vary the thermoplastic content of the copolymer and the mechanical properties of the thermoplastic elastomer.

DETAILED DESCRIPTION OF THE PREFERRED EMBODIMENTS

The present invention provides an energetic thermoplastic elastomer (ETPE) having linear copolymer chains having the formulae:

$$HO—P—(U—P)n—OH \quad (I)$$

wherein the macromonomers P are derived from energetic dihydroxyl terminated telechelic polymers having a functionality of two or less such as poly glycidyl azide polymer (GAP), poly 3-azidomethyl-3-methyloxetane (AMMO), poly bis 3,3-azidomethyloxetane (BAMO), poly 3-nitratomethyl-3-methyloxetane (NIMMO) and poly glycidyl nitrate (GLYN), with poly GAP being the most preferred compound.

U are components of diisocyanates such as 4,4' methylenebis-phenyl isocyanate (MDI), toluene diisocyanate (TDI), hexamethylene diisocyanate (HMDI) and isophorone diisocyanate (IPDI).

The energetic thermoplastic elastomer of the present invention may further include a chain extender. Suitable chain extenders are:

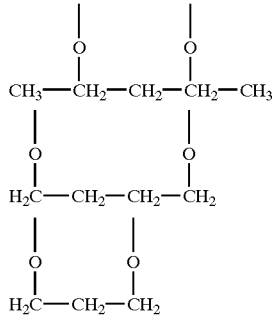

and —OCH$_2$—(CH$_2$)n—CH$_2$O— where n is 0 to 8.

In the present invention, the chain extenders serve a dual purpose. As usual, these chain extenders can be used to increase the molecular weight of the copolymers, but unlike conventional chain extenders, they are also used to increase the hard segment in the energetic thermoplastic elastomer.

The energetic copolymer (I) of the present invention is obtained by polymerizing a dihydroxyl terminated telechelic energetic polymer having a functionality of two or less such as poly glycidyl azide polymer, poly 3-azidomethyl-3-methyloxethane, poly 3-nitratomethyl-3-methyloxetane and poly glycidyl nitrate with a diisocyanate such as 4,4' methylenebis-phenyl isocyanate, toluene diisocyanate, hexamethylene diisocyanate, and isophorone diisocyanate at a NCO/OH ratio ranging from about 0.7 to about 1.2 under dried conditions. The most preferred ratio is about one. The resulting copolymers comprise urethane groups which form hydrogen bonds between the chain of copolymers to yield the hard segment in the copolyurethane thermoplastic elastomer. In contrast to the prior art processes, the process of the present invention is cheap in that an expensive crystalline homopolymer, for example BAMO, is not required.

In a more specific example, the following structure (IV) is obtained by the polymerization of GAP with 4,4'-methylenebis-phenyl isocyanate.

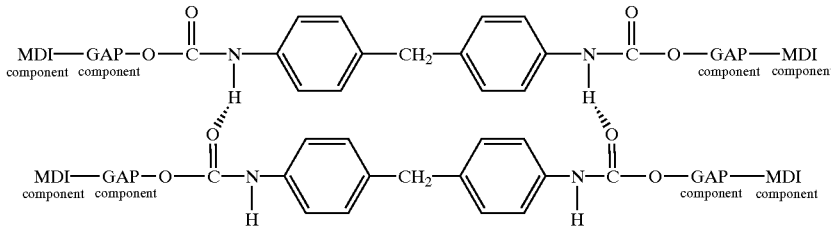

In this copolymer, the elastomeric B segment is provided by the amorphous GAP component and the thermoplastic A segment is provided by the urethane moieties of the MDI component. Each urethane group within the copolymer is capable of forming hydrogen bonds with the oxygen of another urethane or with the oxygen of an ether. By doing so, physical cross-links are obtained between the chains. These physical cross-links are reversible and hence, can be broken by melting or dissolving the copolymer in a suitable solvent so that the polymer can be mixed with other components in, for example, a gun propellant formulation. Such a gun propellant can be isolated upon cooling or evaporating the solvent. Cooling or evaporating the solvent lets the broken physical cross-links, i.e. hydrogen bonds, reform to recover the thermoplastic elastomer, thus providing a recyclable product.

In most case, it is also possible to break the hydrogen bonds by melting them. However, in the case of GAP-based copolyurethane thermoplastic elastomers, the copolyurethane should not be melted as both the decomposition of GAP and the melting point of the polyurethanes occur at about 200° C. Generally, linear polyurethanes have melting points in the region of 200° C. when the thermoplastic content is about 20 to 50% by weight. This is when there is enough hard segments to induce crystallinity.

To obtain the best reproducible thermoplastic elastomer, precautions should be applied to avoid cross-linkings or the formation of covalent bonds. The dihydroxyl terminated telechelic energetic prepolymer should have a functionality of two or less. Branched prepolymers or tri or tetra-functional prepolymers would lead to the formation of undesired chemical bonds (crosslinking) which will lead to a thermoset elastomer instead of a thermoplastic elastomer. In reacting the prepolymer with the diisocyanate, the concentration of isocyanate and hydroxyl groups, i.e. NCO/OH ratio, should preferably be kept between about 0.7 to about 1.2, and most preferably about one to yield linear copolyurethane chains. An excess of isocyanate will yield allophanate or biuret group formation, leading to undesirable covalent cross-linkings.

The reaction should also be performed under dried conditions, i.e. avoiding the presence of water. This generally includes drying the dihydroxyl terminated energetic prepolymers before their polymerization and performing the polymerization step under dried conditions.

If present, water will compete with the hydroxyl group of the prepolymers and react with the isocyanate to yield a carbamic acid which decomposes to liberate carbon dioxide and form an amine group. This amine group reacts with isocyanate, yielding an urea group which introduces rigidity and brittleness to the polyurethane. Moreover, this urea group can react with another isocyanate to give a biuret group, thus introducing covalent cross-linking between the copolymer chains. This is mostly important when using prepolymers having secondary hydroxyl group such as GAP and GLYN since water has a reactivity towards isocyanates similar to that of a secondary hydroxyl group. Whereas, the reactivity of primary hydroxyl groups toward isocyanates is ten times the reactivity of water and thus it is less important to avoid the presence of water when using prepolymers containing primary hydroxyl groups such as AMMO, BAMO and NIMMO.

The formation of hydrogen bonds are optimal with linear copolyurethanes when the molecular weight is the highest and this is obtained when using a NCO/OH ratio of about one. Such copolyurethanes will provide a good alignment between the copolymers chains which promotes the formation of a high number of hydrogen bonds especially when the diisocyanates are aromatic since the aromatic rings have a great tendency to stacking-up resulting in a perfect alignment of the urethane moieties. The mechanical properties of the copolymers are directly related to the number of hydrogen bonds formed. A high degree of alignment will result in the formation of a high number of hydrogen bonds. This gives a strong hard segment domains and therefore, a strong copolyurethane thermoplastic elastomers. Hence, better quality energetic thermoplastic elastomers are obtained as the NCO/OH approaches one.

A suitable catalyst such as dibutyltin dilaurate can be used to ensure a complete reaction. Preferably, the catalyst is mixed with the prepolymers before the latter is dried to ensure that it is well dispersed in the prepolymer.

Preferably, the diisocyanate is purified prior to its use. This applies mostly to MDI which has a high reactivity towards water and in its presence will form an amino isocyanate or a diamino compound. This compound will introduce chemical cross-linking.

Chain extenders such as ethylene glycol, 1,3-propanediol, 1,4-butanediol and 2,4-pentanediol or other low molecular weight diols may be added to increase the content of hard segments in the thermoplastic elastomer. The addition of chain extenders results in the formation of localized diurethane groups within the copolymer and consequently more hydrogen bonding leading to stronger hard segment domains and stronger copolyurethane thermoplastic elastomers. When using chain extenders, one should increase the amount of diisocyanates in order to keep the NCO/OH at the desired ratio.

The chain extenders can be mixed with the diisocyanate before the addition of the prepolymers or they could be mixed simultaneously with the prepolymers and diisocyanate. In the former case, one would obtain segments consisting of consecutive —U—C— units leading to a linear copolyurethane having the following general formula:

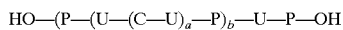

wherein

P is selected from the group consisting of

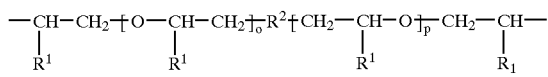

where the
R¹ groups are the same and selected from the group consisting of —CH$_2$N$_3$ and —CH$_2$ONO$_2$;
R² is selected from the group consisting of —OCH$_2$CH$_2$O—, —OCH$_2$CH$_2$CH$_2$O— and —OCH$_2$CH$_2$CH$_2$CH$_2$O—; and o and p are each $\geq 1$; and

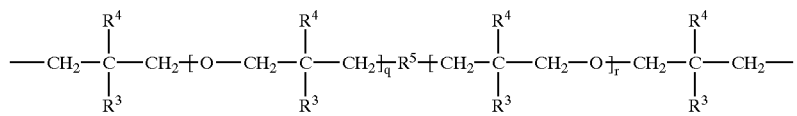

where the
R³ groups are the same and selected from the group consisting of —CH$_2$N$_3$ or —CH$_2$ONO$_2$ when the R⁴ groups are —CH$_3$; or R³ and R⁴ are both —CH$_2$N$_3$
R⁵ is selected from the group consisting of —OCH$_2$CH$_2$O—, —OCH$_2$CH$_2$CH$_2$O— and —OCH$_2$CH$_2$CH$_2$CH$_2$O—; and q and r are both $\geq 1$ U is selected from the group consisting of

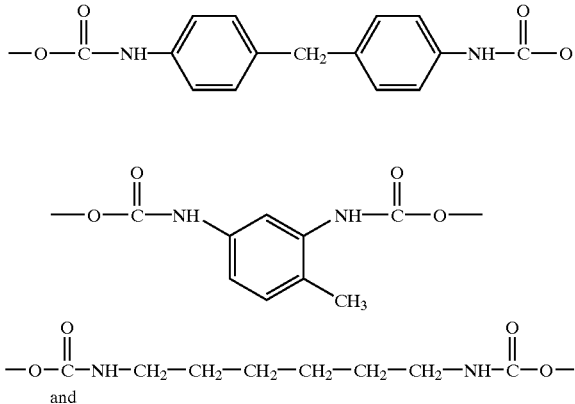

and

C is selected from the group consisting of

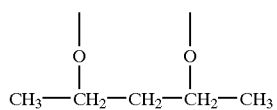

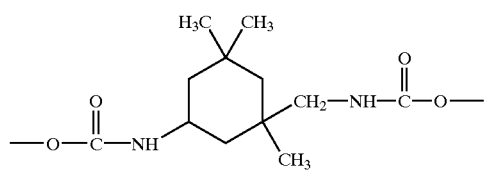

and
—OCH$_2$—(CH$_2$)n—CH$_2$O— where n is 0 to 8.
a is 1 to 100 and b is 1 to 100

This results in very localized hydrogen bonds leading to a hard rubber.

In the latter case, the —C—U— unit is more distributed statistically within the copolymer yielding a copolyurethane having a linear copolyurethane chain having the following formulae:

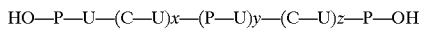

wherein P, U and C are defined as above, and x, y and z are each an integer from 1 to 100.

This will result in a softer rubber than the former case.

Preferably, chain extenders having primary hydroxyl groups are used with energetic prepolymers having primary hydroxyl groups. For example, ethylene glycol would be a good candidate for the polymerization of ETPE based on AMMO or NIMMO prepolymers. Likewise chain extenders having secondary hydroxyl groups such as 2,4-pentanediol is better suited for energetic prepolymers having secondary hydroxyl groups such as GAP and GLYN since the reactivity of the hydroxyl groups are similar.

The properties of the energetic thermoplastic elastomer can also be modified by varying the type of prepolymers used. For example, in applying the process of the present invention to amorphous prepolymers such as GAP, GLYN, AMMO and NIMMO, the resulting product is a rubber having elastomeric properties. However, if the process is applied to a thermoplastic prepolymer such as BAMO, the final product will a hard wax.

The polymerization step in accordance with the method of the present invention may also be performed in a suitable solvent such as ethyl acetate to avoid the solvation step which is necessary if the copolymer is to be used as a component of, for example, a gun propellant obtained using a solvent process.

The present invention is further described in the following non-limiting examples.

Chemicals

GAP $M_n$=2000 was obtained from 3M company, Minnesota, U.S.A. Dibutyltin dilaurate and 4,4' methylenebis-phenyl isocyanate were obtained from Aldrich Chemical Co., Milwaukee, Wis., U.S.A. Poly-NIMMO $M_n$=2000 was obtained from ICI England.

EXAMPLE 1

Preparation of GAP $M_n$=2000 Copolyurethane Thermoplastic Elastomer

1. Determination of the Concentration of OH in GAP $M_n$=2000 by the Equivalent Weight (EW) Method Using NMR Spectroscopy 0.23 g of GAP $M_n$=2000 was reacted with 0.4 mL of acetic anhydride in 5 mL of pyridine at 95° C. in a corked container for 12 hours. The pyridine was evaporated under vacuum (1 to 5 torrs) to give an acetylated polymer and residual pyridine, acetic anhydride and acetic acid. The pyridine, acetic anhydride and acetic acid were removed by dissolution of the acetylated polymer in 30 mL of toluene and co-evaporated under vacuum (1 to 5 torrs). The co-evaporation step was repeated twice and completed with a final evaporation under higher vacuum (0.1 to 1 torr) using a mechanical pump. The resulting acetylated derivative was dissolved in $CDCl_3$ and the $^1H$ NMR spectra was acquired. The equivalent weight determination for GAP was made by integrating the large intensity of the polymer peaks in the region 3.5–4.0 ppm followed by the integration of the acetyl group at 2.1 ppm. The EW was calculated by the following equation:

$$EW \text{ (g/mol)}: \frac{I_{GAP}/5 \times MW}{I_{CH3}/3}$$

wherein

EW is equivalent weight (g/mol of alcohol);

$I_{GAP}$ is the area under the GAP peaks in the $^1H$ spectrum (between 3.5 and 4.0 ppm);

$I_{CH3}$ is the area under the $CH_3$ acetyl peak in the $^1H$ spectrum (at 2.1 ppm); and MW is the molecular weight of the monomer repetition unity of GAP (99.1 g/mol).

The EW for GAP $M_n$=2000 was found to be 1200 g/mol.

2. Polymerization 100 g (0.083 mole of OH) of GAP $M_n$=2000 was mixed with 0.05 g of dibutyltin dilaurate (0.05%) to ensure its dispersion in the polymer. The mixture was magnetically stirred in a 500 mL round bottom flask and heated to 60° C. under vacuum for 16 hours to thoroughly dry the prepolymer. The dryness of the prepolymer was evaluated using Karl-fisher analysis. The prepolymer was considered to be dried when there is 0 to 300 ppm of water therein. 10.1042 g (0.0404 mole MDI; 0.081 mole NCO) of freshly distilled 4,4' methylenebis-phenyl isocyanate was added to the hot dried polymer. This gave a NCO/OH ratio of 0.97. The diisocyanate-polymer mixture was thoroughly mixed for one minute and put into a preheated desiccator at 60° C., and a vacuum was applied for about five minutes to remove all gases. The desiccator was then placed in an oven at 60° C. for about 24 hours to complete the polymerization. A GAP-based copolyurethane thermoplastic elastomer having a molecular weight $M_n$ varying from 35,000 to 40,000 was obtained upon cooling, yield 110.15 g.

The spectroscopic analysis of the above product is as follows:

IR: $v_{max}$ (FILM) $cm^{-1}$: 3400, 3320, 2920, 2860, 2100, 1730, 1590, 1520, 1440, 1410, 1340, 1290, 1210, 1100, 930, 910, 850, 810, 660.

$^1HNMR$: d ($CDCl_3$) ppm: 3.1–4.1 (all other protons, m), 5.1 (C$\underline{H}$O—CONH, m), 7.0 (N$\underline{H}$, m), 7.2 (aromatic protons, AB system, $^3J_{AB}$=8.0 Hz $^{13}CNMR$: δ ($CDCl_3$) ppm: 41.2 (phenyl-$\underline{C}H_2$), 52.2 ($CH_2N_3$),70.1–72.6 ($CH_2O$), 79.3 (CHO), 119.6 (carbons ortho to NH), 130.0 (carbons meta to NH), 136.2 (carbons para to NH), 137.2 ($\underline{C}$—NH aromatic), 153.0 (urethane carbonyl).

IR=infrared, $^1HNMR$=proton nuclear magnetic resonance, $^{13}CNMR$=carbon nuclear magnetic resonance, J=coupling constant in hertz (Hz), m=multiplet, s=singlet.

EXAMPLE 2

Preparation of GAP $M_n$=2000 Copolyurethane Thermosplastic Elastomer in Ethyl Acetate Solvent 100 g of GAP $M_n$=2000 was mixed with 0.05 g of dibutyltin dilaurate (0.05%) and the mixture was magnetically stirred in a 500 mL round bottom flask and heated to 60° C. under vacuum for 16 hours. Dried ethyl acetate was added to the flask in a concentration to obtain 30 to 70% by weight of polymers. 10.1042 g of freshly distilled 4,4' methylenebis-phenyl isocyanate was added to the round bottom flask. The solvated diisocyanate-polymer mixture was stirred at 60° C. for about 24 hours to complete the polymerization. A solvated GAP-based copolyurethane thermoplastic elastomer of molecular weight $M_n$ varying from about 35,000 to 40,000 was obtained upon cooling. The solvated elastomer can be used as is in the preparation of high-energy compositions.

EXAMPLE 3

Preparation of Poly-NIMMO $M_n$=2000 Copolyurethane Thermoplastic Elastomer

1. Determination of the Concentration of OH in Poly-NIMMO $M_n$=2000

The concentration of OH in poly-NIMMO $M_n$=2000 was found to be 1000 g/mole using the equivalent weight method as described in example 1.

2. Polymerization 100 g (0.1 mole of OH) of poly-NIMMO was mixed with 0.05 g of dibutyltin dilaurate to ensure its dispersion in the polymer and the mixture was stirred in a 500 mL bottom flask and heated to 60° C. under vacuum for 16 hours. 10 g (0.04 mole of MDI; 0.08 mole of NCO) of freshly distilled 4,4' methylenebis-phenyl isocyanate was added to the hot dried polymer. This gave a NCO/OH ratio of 0.80. The diisocyanate-NIMMO mixture was thoroughly mixed for one minute and put into a preheated desiccator at 60° C. and a vacuum was applied for about five minutes to remove all gases. The desiccator was then placed in an oven at 60° C. for 24 hours to complete the polymerization. A NIMMO-based copolyurethane thermoplastic elastomer of molecular weight $M_n$ of about 15,000 to 17,000 was obtained upon cooling, yield 110.05 g.

Alternatively, the NIMMO polymer was purified by precipitation in methanol prior to the polymerization step in order to remove trifunctional oligomer impurities present in the commercial poly-NIMMO sample, and the polymerization was performed as described above to yield quantitatively the copolyurethane thermoplastic elastomer of molecular weight of about 15,000 to 17,000. In this case, the NCO/OH ratio was about 0.95.

IR: $v_{max}$ (FILM)$cm^{-1}$: 3400, 3320, 2960, 2930, 2880, 1730, 1630, 1520, 1480, 1450, 1410, 1360, 1280, 1220, 1100, 1060, 980, 860, 750, 700, 630, 610.

$^1HNMR$: δ (Acetone-$D_6$) ppm: 1.0 ($CH_3$, s), 3.3 ($CH_2$—O, s), 4.1 (phenyl-$CH_2$, s), 4.5 ($CH_2ONO_2$, s), 7.3 (aromatic protons, AB system, $^3J_{AB}$=8.0 Hz), 8.7 (NH-urethane, s).

$^{13}CNMR$: δ (Acetone-$D_6$) ppm: 17.9 ($CH_3$), 41.5 (phenyl-$\underline{C}H_2$), 74.6 ($CH_2O$), 76.5 ($CH_2ONO_2$), 119.7 (carbons ortho to NH), 130.3 (carbons meta to NH), 137.3 (carbons para to NH), 138.4 (C—NH aromatic), 154.8 (urethane carbons).

All the copolyurethanes synthesized according to the process of the present invention are rubber-like material which can easily be dissolved in a solvent such as dried ethyl acetate in a polymer to solvent ratio of about 35:65. The resulting solvated material can be used as an energetic binder in high-energy compositions.

EXAMPLE 4

Emulation of ETPE Based on GAP 1000 Using GAP 2000 and a Chain Extender

The mechanical properties of ETPE based on GAP 1000 which contains 20% of hard segments, may be emulated using commercially available GAP 2000 combined with the chain extender 2,4-pentanediol in order to increase the hard segment from 10 to 20%. Commercially available GAP 2000 typically has 10% hard segment. This is advantageous since GAP 1000 is not available commercially. Also, usually ETPE are synthesised from prepolymers of fixed molecular weight to give a fixed hard segment content. This can be overcome by using the chain extender and process of the present invention to obtain intermediate hard segment contents such as 14.5%.

Polymerization 372.7813 g (0.3107 mole of OH) of GAP $M_n$=2000 was mixed with 0.1864 g of dibutyltin dilaurate (0.05%) to ensure its dispersion in the polymer. The mixture was magnetically stirred in a 1000 mL round bottom flask and heated to 60° C. under vacuum for 16 hours to thoroughly dry the prepolymer. The dryness of the prepolymer was evaluated using Karl-fisher analysis which indicated 88 ppm of water at the end of the drying period. The prepolymer was considered dried. Freshly distilled 2,4-pentanediol was added to the flask (27.22 g, 0.2614 mole; 0.5227 mole of OH) and the stirring was continued for 30 minutes. 100 g (0.3996 mole MDI; 0.7992 mole NCO) of freshly distilled 4,4' methylenebis-phenyl isocyanate was added to the hot dried mixture of prepolymer and chain extender. This gave a NCO/OH ratio of 0.96. The diisocyanate-polymer-chain extender mixture was thoroughly mixed for one minute and put into a preheated desiccator at 60° C., and a vacuum was applied for about five minutes to remove all gases. The desiccator was then placed in an oven at 60° C. for about 24 hours to complete the polymerization. A GAP-based copolyurethane thermoplastic elastomer having a molecular weight $M_n$ of 25,000 was obtained upon cooling, yielding 500 g of material.

The spectroscopic analysis of the above product is as follows:

IR: $v_{max}$ (FILM) cm$^{-1}$: 3400, 3330, 2930, 2880, 2523, 2105, 1730, 1711, 1599, 1532, 1445, 1415, 1350, 1307, 1283, 1224, 1125, 1020, 937, 856, 818, 769, 669.

$^1$HNMR: d (CDCl$_3$) ppm: 1.29 (CH$_3$—CHO—, s) 3.1–3.9 (all other protons, m), 5.1 (CHO—CONH, m), 7.0 (NH, m), 7.2 (aromatic protons, AB system, $^3J_{AB}$=8.0 Hz)

$^{13}$CNMR: δ (CDCl$_3$) ppm: 19.9 (CH$_3$), 40.0–41.6 (phenyl-CH$_2$), 50.6 (CH$_2$N$_3$), 68.0–71.5 (CH$_2$O et CHO—CH$_2$—CHO), 77.6 (CHO), 118.1 (carbons ortho to NH), 128.3 (carbons meta to NH), 135.8 (carbons para to NH), 136.2 (C—NH aromatic), 152.0 (urethane carbonyl).

It was observed that the sample was harder compared to an ETPE based on GAP 1000 that has been directly synthesis, i.e. without the use of a chain extender. This is expected since the use of a chain extender will lead to more localized MDI units within the copolymer giving a hard domain more concentrated. In our experience, to synthesize an ETPE with chain extender that has the same molecular properties than the ETPE with GAP 1000, we would synthesize an ETPE at 16% of hard segment. Therefore, a lower content of hard segment is required to achieve the same mechanical properties. This is also advantageous since the copolymer will consists of more GAP and hence be more energetic.

While the foregoing embodiments of the present invention have been described and shown, it is understood that all alternatives and modifications may be made thereto and fall within the scope of the invention.

We claim:

1. An energetic thermoplastic elastomer comprising a hard segment generated by the formation of hydrogen bonds between a first urethane group of one linear copolymer chain with a second urethane group of another linear copolymer chain and a chain extender, wherein the first and second urethane groups are selected from the group consisting of:

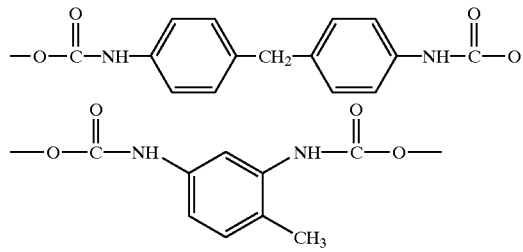

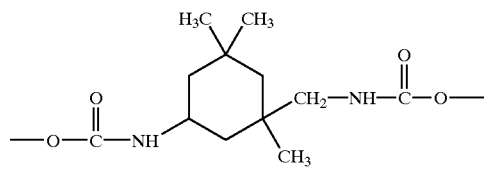

and

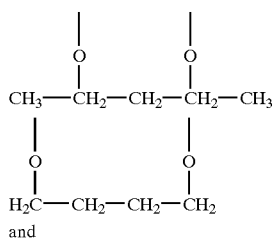

and the energetic thermoplastic elastomer, further comprises a soft segment generated by a macromonomer derived from a prepolymer selected from the group consisting of glycidyl azide polymer, poly-3-azidomethyl-3-methyloxetane, poly-3-nitratomethyl-3-methyloxetane, and poly-glycidyl nitrate.

2. The energetic thermoplastic elastomer according to claim 1, wherein said prepolymer is glycidyl azide polymer.

3. The energetic thermoplastic elastomer according to claim 1, wherein said prepolymer has a molecular weight ranging from about 500 to about 10,000.

4. The energetic thermoplastic elastomer according to claim 1, wherein the chain extender is selected from the group consisting of —OCH$_2$—(CH$_2$)n—CH$_2$O— where n is 0 to 8;

$$\begin{array}{c} \phantom{x} \\ CH_3-CH_2-CH_2-CH_2-CH_3 \\ \phantom{x} \end{array}$$

with O substituents, and $$H_2C-CH_2-CH_2-CH_2$$

with O substituents and

-continued $$\begin{array}{cc} | & | \\ O & O \\ | & | \\ H_2C-CH_2-CH_2 \end{array}$$

wherein the addition of said chain extender increases the content of said hard segment.

5. A thermoplastic elastomer comprising a linear copolymer chain comprising an A block and a B block, said copolymer chain having the formula:

HO—P—(U—P)$n$—OH wherein

P is selected from the group consisting of $$-\underset{R^1}{CH}-CH_2 \text{\textemdash} O-\underset{R^1}{CH}-CH_2\text{\textemdash}_o R^2 \text{\textemdash} CH_2-\underset{R^1}{CH}-O\text{\textemdash}_p CH_2-\underset{R^1}{CH}-$$

where the
R$^1$ groups are the same and selected from the group consisting of —CH$_2$N$_3$ and —CH$_2$ONO$_2$;
R$^2$ is selected from the group consisting of —OCH$_2$CH$_2$O—, —OCH$_2$CH$_2$CH$_2$O— and —OCH$_2$CH$_2$CH$_2$CH$_2$O—; and o and p are each $\geq 1$; and $$-CH_2-\underset{R^3}{\overset{R^4}{C}}-CH_2\text{\textemdash}O-CH_2-\underset{R^3}{\overset{R^4}{C}}-CH_2\text{\textemdash}_q R^5\text{\textemdash}CH_2-\underset{R^3}{\overset{R^4}{C}}-CH_2-O\text{\textemdash}_r CH_2-\underset{R^3}{\overset{R^4}{C}}-CH_2-$$

where the
R$^3$ groups are the same and are selected from the group consisting of —CH$_2$N$_3$ and —CH$_2$ONO$_2$ and the R$^4$ groups are —CH$_3$;
R$^5$ is selected from the group consisting of —OCH$_2$CH$_2$O—, —OCH$_2$CH$_2$CH$_2$O— and —OCH$_2$CH$_2$CH$_2$CH$_2$O—; and q and r are both $\geq 1$ U is selected from the group consisting of

[structure: —O—C(=O)—NH—C$_6$H$_4$—CH$_2$—C$_6$H$_4$—NH—C(=O)—O—]

[structure: —O—C(=O)—NH—C$_6$H$_3$(CH$_3$)—NH—C(=O)—O—]

and

[structure: isophorone diisocyanate derivative with —O—C(=O)—NH— and —CH$_2$—NH—C(=O)—O— groups on cyclohexane ring with H$_3$C, CH$_3$, CH$_3$ substituents]

and
n is 1 to 100 wherein said A block is provided by said U moieties and said B block is provided by said P moieties and said elastomer further comprises a chain extender.

6. The thermoplastic elastomer according to claim 5, wherein P has a molecular weight ranging from about 500 to 10,000.

7. The thermoplastic elastomer according to claim 5, wherein P is $$-\underset{R^1}{CH}-CH_2 \text{\textemdash} O-\underset{R^1}{CH}-CH_2\text{\textemdash}_o R^2 \text{\textemdash} CH_2-\underset{R^1}{CH}-O\text{\textemdash}_p CH_2-\underset{R_1}{CH}-$$

in which
R$^1$ is —CH$_2$N$_3$; R$^2$ is —OCH$_2$CH$_2$O—;
and o and p are each $\geq 1$; and
U is

[structure: —O—C(=O)—NH—C$_6$H$_4$—CH$_2$—C$_6$H$_4$—NH—C(=O)—O—]

8. The thermoplastic elastomer according to claim 7, wherein P has a molecular weight of 500, 1000 or 2000.

9. The thermoplastic elastomer according to claim 5 wherein R$^3$ is —CH$_2$N$_3$.

10. The thermoplastic elastomer according to claim 9, wherein P has a molecular weight ranging from about 500 to about 10,000.

11. The thermoplastic elastomer according to claim 5, wherein said chain extender is selected from the group consisting of $$\begin{array}{c} | \quad\quad | \\ O \quad\quad O \\ | \quad\quad | \\ CH_3-CH_2-CH_2-CH_2-CH_3 \\ | \quad\quad | \\ O \quad\quad O \\ | \quad\quad | \\ H_2C-CH_2-CH_2-CH_2 \\ | \quad\quad | \\ O \quad\quad O \\ | \quad\quad | \\ H_2C-CH_2-CH_2 \end{array}$$

and

—OCH$_2$—(CH$_2$)n—CH$_2$O— where n is 0 to 8.

12. A thermoplastic elastomer comprising a linear copolymer chain comprising an A block and a B block, said copolymer chain having the formula:

HO—P—(U—(C—U)$_a$—P)$_b$—U—P—OH wherein

P is selected from the group consisting of $$-\underset{R^1}{CH}-CH_2+O-\underset{R^1}{CH}-CH_2\underset{o}{\rceil}R^2+CH_2-\underset{R^1}{CH}-O\underset{p}{\rceil}CH_2-\underset{R^1}{CH}-$$

where the
- $R^1$ groups are the same and selected from the group consisting of $-CH_2N_3$ and $-CH_2ONO_2$;
- $R^2$ is selected from the group consisting of $-OCH_2CH_2O-$, $-OCH_2CH_2CH_2O-$ and $-OCH_2CH_2CH_2CH_2O-$; and o and p are each $\geq 1$;

and $$-CH_2-\underset{R^3}{\overset{R^4}{C}}-CH_2+O-CH_2-\underset{R^3}{\overset{R^4}{C}}-CH_2\underset{q}{\rceil}R^5+CH_2-\underset{R^3}{\overset{R^4}{C}}-CH_2-O\underset{r}{\rceil}CH_2-\underset{R^3}{\overset{R^4}{C}}-CH_2-$$

where the
- $R^3$ groups are the same and are selected from the group consisting of $-CH_2N_3$ and $-CH_2ONO_2$ and the $R^4$ groups are $-CH_3$,
- $R^5$ is selected from the group consisting of $-OCH_2CH_2O-$, $-OCH_2CH_2CH_2O-$ and $-OCH_2CH_2CH_2CH_2O-$; and q and r are both $\geq 1$ U is selected from the group consisting of

[structure: $-O-\overset{O}{\overset{\|}{C}}-NH-\langle\text{phenyl}\rangle-CH_2-\langle\text{phenyl}\rangle-NH-\overset{O}{\overset{\|}{C}}-O-$]

[structure: $-O-\overset{O}{\overset{\|}{C}}-NH-\langle\text{phenyl with CH}_3\rangle-NH-\overset{O}{\overset{\|}{C}}-O-$]

[structure: isophorone diisocyanate-derived urethane, $-O-\overset{O}{\overset{\|}{C}}-NH-\langle\text{cyclohexyl with H}_3C, CH_3, CH_3\rangle-CH_2-NH-\overset{O}{\overset{\|}{C}}-O-$]

C is selected from the group consisting of

[structure: $CH_3-CH_2-CH_2-CH_2-CH_3$ with two O branches]

[structure: $H_2C-CH_2-CH_2-CH_2$ with two O branches]

[structure: $H_2C-CH_2-CH_2$ with two O branches]

and
$-OCH_2-(CH_2)n-CH_2O-$ where n is 0 to 8.

a is 1 to 100 and b is 1 to 100 wherein said A block is provided by said U moieties and said B block is provided by said P moieties.

13. The thermoplastic elastomer according to claim 12, wherein P has a molecular weight ranging from about 500 to about 10,000.

14. The thermoplastic elastomer according to claim 12 wherein $R^3$ is $-CH_2N_3$.

15. The thermoplastic elastomer according to claim 14, wherein P has a molecular weight ranging from about 500 to about 10,000.

16. A thermoplastic elastomer comprising a linear copolymer chain comprising an A segment and a B segment, said copolymer chain having the formula:

$$HO-P-U-(C-U)x-(P-U)y-(C-U)z-P-OH$$

wherein

P is selected from the group consisting of $$-\underset{R^1}{CH}-CH_2+O-\underset{R^1}{CH}-CH_2\underset{o}{\rceil}R^2+CH_2-\underset{R^1}{CH}-O\underset{p}{\rceil}CH_2-\underset{R^1}{CH}-$$

where the
- $R^1$ groups are the same and selected from the group consisting of $-CH_2N_3$ and $-CH_2ONO_2$;
- $R^2$ is selected from the group consisting of $-OCH_2CH_2O-$, $-OCH_2CH_2CH_2O-$ and $-OCH_2CH_2CH_2CH_2O-$; and o and p are each $\geq 1$; and

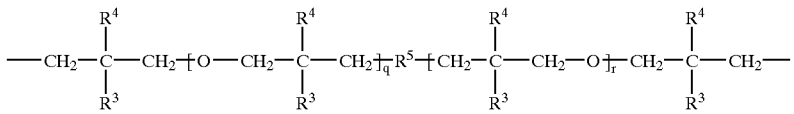

where the
- $R^3$ groups are the same and are selected from the group consisting of —$CH_2N_3$ and —$CH_2ONO_2$ and the $R^4$ groups are —$CH_3$,
- $R^5$ is selected from the group consisting of —$OCH_2CH_2O$—, —$OCH_2CH_2CH_2O$— and —$OCH_2CH_2CH_2CH_2O$—; and q and r are both $\geq 1$ U is selected from the group consisting of

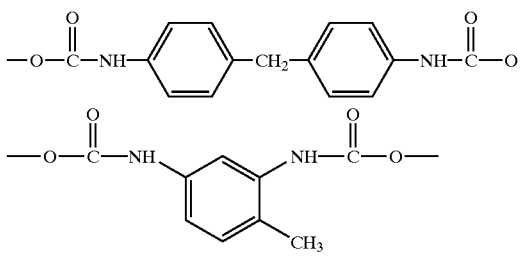

and

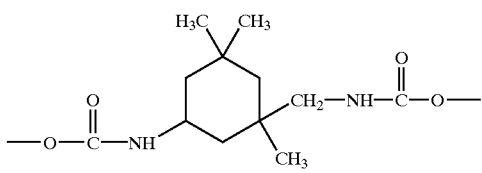

C is selected from the group consisting of

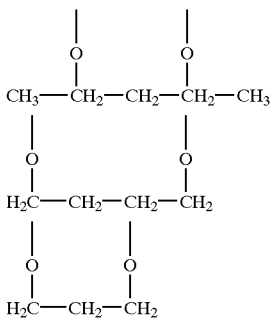

and
—$OCH_2$—$(CH_2)n$—$CH_2O$— where n is 0 to 8;
x, y and z are each an integer from 1 to 100;
wherein said A segment is provided by said U moieties and said B segment is provided by said P moieties.

17. The thermoplastic elastomer according to claim 16, wherein P has a molecular weight ranging from about 500 to about 10,000.

18. The thermoplastic elastomer according to claim 16 wherein $R^3$ is —$CH_2N_3$.

19. The thermoplastic elastomer according to claim 18, wherein P has a molecular weight ranging from about 500 to about 10,000.

20. A method of preparing an energetic thermoplastic elastomer comprising the steps of:
(a) drying a dihydroxyl terminated telechelic energetic prepolymer having a functionality of two or less; and
(b) polymerizing said dried energetic prepolymer with a diisocyanate at a NCO/OH ratio ranging from about 0.7 to 1.2 under dried conditions
wherein a chain extender is added to the diisocyanate before the addition of the prepolymer or mixed simultaneously with the prepolymers and the diisocyanate.

21. The method according to claim 20, wherein the drying step (a) is performed in the presence of a catalyst.

22. The method according to claim 21, wherein said catalyst is dibutyltin dilaurate.

23. The method according to claim 20 further comprising the step of purifying said diisocyanate prior to its use.

24. The method according to claim 20, wherein said energetic prepolymer is selected from the group consisting of glycidyl azide polymer, 3-azidomethyl-3-methyloxethane, 3-nitratomethyl-3-methyloxetane, 3,3-bis(azidomethyl)oxetane and glycidyl nitrate.

25. The method according to claim 20, wherein said energetic prepolymer has a molecular weight ranging from about 500 to about 10,000.

26. The method according to claim 20, wherein said diisocyanate is selected from the group consisting of 4,4' methylenebis-phenyl isocyanate, toluene diisocyanate, hexamethylene diisocyanate and isophorone diisocyanate.

27. The method according to claim 20, wherein the chain extender is selected from the group consisting of 2,4-pentanediol, 1,3-propanediol, 1,4-butanediol or a diol having the formula:

HO—$CH_2$—$(CH)n$—$CH_2$—OH where n is 0 to 8.

28. The method according to claim 20, wherein said NCO/OH ratio is about one.

29. The method according to claim 20, wherein said polymerization step is performed in a suitable solvent.

30. A method of preparing an energetic thermoplastic elastomer comprising a linear copolymer chain having the formula:

HO—P—(U—P)n—OH wherein
P is selected from the group consisting of

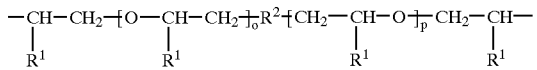

where the
- $R^1$ groups are the same and selected from the group consisting of —$CH_2N_3$ and —$CH_2ONO_2$;
- $R^2$ is selected from the group consisting of —$OCH_2CH_2O$—, —$OCH_2CH_2CH_2O$— and —$OCH_2CH_2CH_2CH_2O$—; and o and p are each $\geq 1$; and

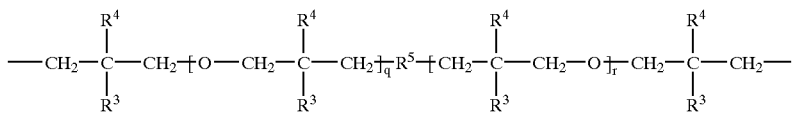

where the
R³ groups are the same and selected from the group consisting of —CH₂N₃ and —CH₂ONO₂;
the R⁴ groups are —CH₃
R⁵ is selected from the group consisting of —OCH₂CH₂O—, —OCH₂CH₂CH₂O— and —OCH₂CH₂CH₂CH₂O—; and q and r are both ≧1
U is selected from the group consisting of

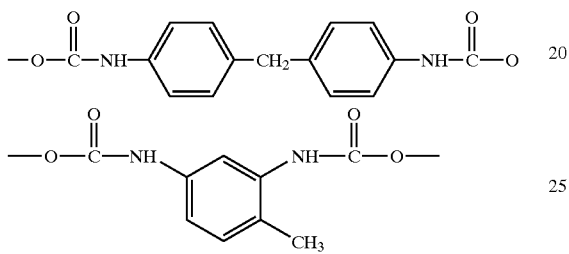

and

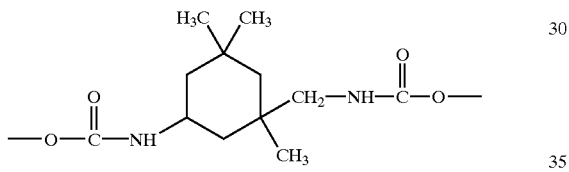

n is 1 to 100;
said method comprises polymerizing a dihydroxyl terminated telechelic energetic prepolymer having a functionality of two or less selected from the group consisting of poly glycidyl azide polymer, poly 3-azidomethyl-3-methyloxethane, poly 3-nitratomethyl-3-methyloxetane, and poly glycidyl nitrate with a diisocyanate selected from the group consisting of 4,4' methylenebis-phenyl isocyanate, toluene diisocyanate, and isophorone diisocyanate at a NCO/OH ratio ranging from about 0.7 to about 1.2 under dried conditions, and adding a chain extender to increase the hard content of the energetic thermoplastic elastomer.

31. A method of preparing an energetic thermoplastic elastomer having the formula:

HO—P—(U—P)n—OH wherein
P is selected from the group consisting of

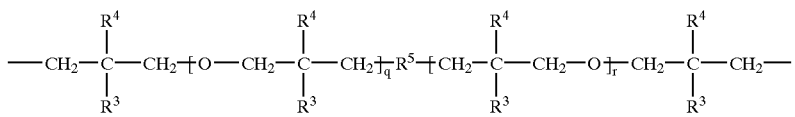

where the
R³ and R⁴ groups are —CH₂N₃;
R⁵ is selected from the group consisting of —OCH₂CH₂O—, —OCH₂CH₂CH₂O— and —OCH₂CH₂CH₂CH₂O—; and q and r are both ≧1
U is selected from the group consisting of

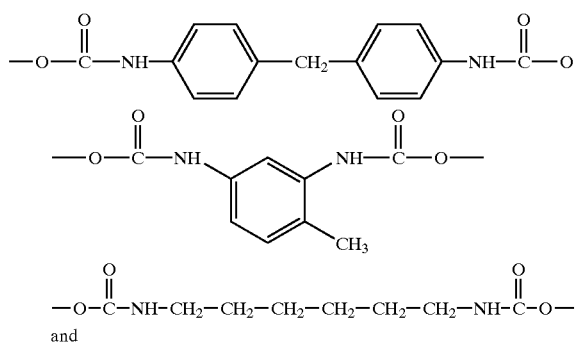

and

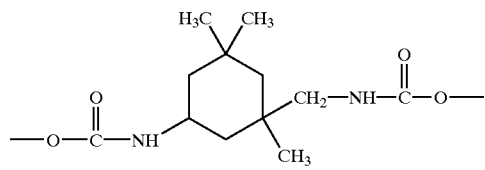

n is 1 to 100;
said method comprises polymerizing poly 3,3-bis (azidomethyl)oxetane with a diisocyanate selected from the group consisting of 4,4' methylenebis-phenyl isocyanate, toluene diisocyanate and isophorone diisocyanate at a NCO/OH ratio ranging from about 0.7 to 1.2 under dried conditions and adding a chain extender to increase the hard content of said energetic thermoplastic elastomer.

32. The method according to claim 30 or 31, further comprising drying said energetic prepolymer prior to the polymerization step.

33. The method according to claim 32, further comprising performing said drying step in the presence of a suitable catalyst.

34. The method according to claim 33, wherein said catalyst is dibutyltin dilaurate.

35. The method according to claim 30 or 31, further comprising purifying said diisocyanate prior to its use.

36. The method according to claim 30 or 31, wherein said energetic P has a molecular weight ranging from about 500 to about 10,000.

37. The method according to claim 30 or 31, wherein said NCO/OH ratio is about one.

38. The method according to claim 30 or 31, wherein said chain extender is selected from the group consisting of 2,4 pentanediol; 1,3-propanediol; 1,4-butanediol or a diol having the formula: $HO-CH_2-(CH)n-CH_2-OH$ where n is 0 to 8.

* * * * *